US010391470B2

(12) United States Patent
Edmiston et al.

(10) Patent No.: US 10,391,470 B2
(45) Date of Patent: *Aug. 27, 2019

(54) SOL-GEL DERIVED COMPOSITIONS

(71) Applicant: ABS MATERIALS, INC., Wooster, OH (US)

(72) Inventors: Paul L. Edmiston, Wooster, OH (US); Stephen R. Spoonamore, Wooster, OH (US); Tatiana Eliseeva, Houston, TX (US)

(73) Assignee: ABS Materials, Inc., Wooster, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/264,536

(22) Filed: Sep. 13, 2016

(65) Prior Publication Data

US 2017/0028380 A1 Feb. 2, 2017

Related U.S. Application Data

(63) Continuation of application No. 13/565,718, filed on Aug. 2, 2012, now Pat. No. 9,440,869, which is a continuation-in-part of application No. 13/025,445, filed on Feb. 11, 2011, now Pat. No. 8,754,182, which is a continuation-in-part of application No. 12/560,002, filed on Sep. 15, 2009, now Pat. No. 8,367,793, which is a continuation-in-part of application No. 11/537,944, filed on Oct. 2, 2006, now Pat. No. 7,790,830.

(60) Provisional application No. 60/722,619, filed on Sep. 30, 2005.

(51) Int. Cl.
| | |
|---|---|
| *B01J 20/22* | (2006.01) |
| *B01J 20/26* | (2006.01) |
| *B09C 1/08* | (2006.01) |
| *C02F 1/70* | (2006.01) |
| *C08G 77/52* | (2006.01) |
| *C08G 77/48* | (2006.01) |
| *B01J 20/28* | (2006.01) |
| *B01D 15/02* | (2006.01) |
| *B01D 15/08* | (2006.01) |
| *C02F 1/28* | (2006.01) |
| *C02F 1/68* | (2006.01) |
| *C02F 101/32* | (2006.01) |
| *C02F 101/36* | (2006.01) |
| *C08G 77/00* | (2006.01) |
| *B01D 53/02* | (2006.01) |

(52) U.S. Cl.
CPC ............ *B01J 20/262* (2013.01); *B01D 15/02* (2013.01); *B01D 15/08* (2013.01); *B01J 20/265* (2013.01); *B01J 20/2803* (2013.01); *B01J 20/28047* (2013.01); *B01J 20/28064* (2013.01); *B01J 20/28066* (2013.01); *B01J 20/28073* (2013.01); *B01J 20/28076* (2013.01); *B09C 1/08* (2013.01); *C02F 1/705* (2013.01); *C08G 77/48* (2013.01); *C08G 77/52* (2013.01); *B01D 53/02* (2013.01); *B01D 2253/202* (2013.01); *B01D 2257/2066* (2013.01); *B01J 2220/56* (2013.01); *C02F 1/281* (2013.01); *C02F 1/681* (2013.01); *C02F 2101/32* (2013.01); *C02F 2101/36* (2013.01); *C02F 2305/08* (2013.01); *C08G 77/70* (2013.01); *C08G 2220/00* (2013.01); *Y02P 20/154* (2015.11)

(58) Field of Classification Search
CPC ................................... C07F 7/18; C08G 77/50
See application file for complete search history.

(56) References Cited

U.S. PATENT DOCUMENTS

| | | | |
|---|---|---|---|
| 5,563,707 A | 10/1996 | Prass et al. | |
| 6,881,697 B1 | 4/2005 | Stocker | |
| 7,358,318 B1 | 4/2008 | Tavlarides et al. | |
| 2002/0070168 A1 | 6/2002 | Jiang et al. | |
| 2002/0185444 A1 | 12/2002 | Coronado et al. | |
| 2004/0092004 A1 | 5/2004 | Stanford et al. | |
| 2004/0169157 A1 | 9/2004 | Coronado et al. | |
| 2006/0113231 A1 | 6/2006 | Malik | |
| 2006/0292033 A1 | 12/2006 | Blok | |
| 2007/0059211 A1 | 3/2007 | Edmiston | |
| 2007/0073095 A1 | 3/2007 | White et al. | |
| 2007/0012233 A1 | 5/2007 | Yang | |
| 2007/0112242 A1 | 5/2007 | Edmiston | |
| 2009/0028912 A1 | 1/2009 | Dave | |
| 2009/0098082 A1 | 4/2009 | Wilson | |
| 2009/0294726 A1 | 12/2009 | Hamada et al. | |
| 2010/0092840 A1 | 4/2010 | Konno et al. | |
| 2010/0096334 A1 | 4/2010 | Edmiston | |

(Continued)

FOREIGN PATENT DOCUMENTS

| | | |
|---|---|---|
| CN | 1387462 A | 12/2002 |
| EP | 1262233 A1 | 12/2002 |

(Continued)

OTHER PUBLICATIONS

Notice of Rejection dated Jun. 7, 2016, regarding Japanese Patent Application No. JP2014-524081, and English translation.

(Continued)

*Primary Examiner* — Kuo Liang Peng

(74) *Attorney, Agent, or Firm* — Arent Fox LLP

(57) ABSTRACT

Disclosed are sol gel derived materials obtained from at least one first precursor and at least one second precursor, as well as sol gel derived compositions containing a plurality of alkylsiloxy substituents obtained from such sol-gel derived materials.

17 Claims, No Drawings

(56) References Cited

U.S. PATENT DOCUMENTS

| | | | |
|---|---|---|---|
| 2010/0113856 A1 | 5/2010 | Edmiston | |
| 2011/0000658 A1 | 1/2011 | Tanaka et al. | |
| 2011/0049056 A1 | 3/2011 | Wyndham | |

FOREIGN PATENT DOCUMENTS

| | | | | |
|---|---|---|---|---|
| JP | 2010519542 | | 6/2010 | |
| WO | 2005028604 A1 | | 3/2005 | |
| WO | 2007112242 A1 | | 10/2007 | |
| WO | 2009085996 A1 | | 7/2009 | |
| WO | 2009126207 | | 10/2009 | |
| WO | 2010141426 A1 | | 9/2010 | |
| WO | WO-2010141426 A1 | * | 12/2010 | ............ B01J 20/286 |
| WO | 2012019033 A1 | | 2/2012 | |
| WO | 2012 019033 | * | 9/2012 | |

OTHER PUBLICATIONS

Ekkchard Lindner, Thomas Salesch, Frank Hoehm and Ilermano A. Mayer: "Supported Organometallic Complexes. XXI [1], Novel D- and T-functionalized Polysiloxane Matrices for Reactions in Interphases," Anorg. Allg. Chem, vol. 625, No. 12, Jul. 7, 1999, p. 2133-2143.
First Office Action dated May 29, 2015, regarding China Application No. CN201280045599.
China Second Office Action dated Mar. 9, 2016, regarding China Application No. 20128045599, and English translation.
Supplementary European Search and Search Opinion dated Apr. 29, 2015, regarding EP12820297.5.
Walker et al: "Selective detection of gas-phase TNT by integrated optical waveguide spectrometry using molecularly imprinted sol-gel sensing films", Analytica Chimica Acta, Elsevier, Amsterdam, NL, vol. 593, No. 1, Jun. 12, 2007 (Jun. 12, 2007), pp. 82-91, XP022233522, ISSN: 0003-2670, DOI: 10.1016/J.ACA.2007.04.034.
International Prelim Report on Patentability dated Jul. 19, 2013 from related International Application No. PCT/US2012/049359.
International Search Report and Written Opinion dated Dec. 19, 2012 from related International Application No. PCT/US2012/049359.
Flory "Principles of Polymer Chemistry" Cornell University Press, 1975, pp. 40-47.
Z. Anorg. Allg. Chem., vol. 625, No. 12, 1999, p. 2133-2143.
International Preliminary Examination Report—Application No. 10 757 891.6-1214, European Patent Office—Feb. 7, 2013, Netherlands.
International Search Report—PCT/US2010/048670, International Search Authority—European Patent Office.
Paul L. Edmiston et al; "Absorption of dissolved organic species from water using organically modified silica that swells"; Separation and Purfication Technology, Elsevier Scient, Amsterdam, NL LNKD-DOI: 10.1016/J Seppur.2009.02.001, vol. 66, May 7, 2009 (May 7, 2009), pp. 532-540, XP007915396.
Boury et al., "Auto-Organization in Sol-Gel Type Polycondensation: A Door to the Nanosciences," The Chemical Record, 3(2):120-132 (2003).
Burkett et al., "Highly Swellable Sol-Gels Prepared by Chemical Modification of Silanol Groups Prior to Drying", Journal of Non-Crystalline Solids, 351:3174-3178 (2005).
Burkett et al., "Organic-Inorganic Hybrid Materials that Rapidly Swell in Non-Polar Liquids: Nanoscale Morphology and Swelling Mechanism", Chem. Mater., 20:1312-1321 (2008).
Cerveau et al., "Influence of Kinetic Parameters on the Textural and Chemical Properties of Silsesquioxane Materials Obtained by Sol-Gel Process", J. Mater. Chem., 9:1149-1154 (1999).
Cerveau et al., "Sol-Gel Process: Influence of the Temperature on the Textural Properties of Organosilsesquioxane Materials", J. Mater. Chem., 10:1617-1622 (2000).
Cerveau et al., "Nanostructured Organic-Inorganic Hybrid Materials: Kinetic Control of the Texture", Chem. Mater. 13:3373-3388 (2001).
Dave et al., "Osmoresponsive Glasses: Osmotically Triggered Volume Changes of Organosilica Sol-Gels as a Means for Controlled Release of Biomolecules", Adv. Mater., 18:2009-2013 (2006).
Kurumada et al., "Structure and Formation Process of Silica Microparticles and Monolithic Gels Prepared by the Sol-Gel Method", Colloids and Surfaces A: Physicochemical and Engineering Aspects, 139:163-170 (1998).
Mehdi et al., "Synthesis of Large-Pore Ordered Mesoporous Silicas Containing Aminopropyl Group", New J. Chem., 29:965-968 (2005).
Rao et al., Thermoresponsive Glasses: Temperature-Controlled Rapid Swelling and Deswelling of Silica-Based Sol-Gels, Adv. Mater., 13(4):274-276 (2001).
Rao et al., "Smart Glasses: Molecular Programming of Dynamic Responses in Organosilica Sol-Gels", Journal of Sol-Gel Science and Technology, 26:553-560 (2003).
Reale et al., "A Fluoride-Catalyzed Sol-Gel Route to Catalytically Active Non-Ordered Mesoporous Silica Materials in the Absence of Surfactants", J. Mater. Chem., 15:1742-1754 (2005).
China Third Office Action dated Sep. 18, 2016 regarding China Application No. CN201280045599.
Rao et al., "Smart Glasses: Molecular Programming of Rapid Dynamic Responses in Organosilica Sol-Gels", Advanced Materials 2002, vol. 14, No. 6, Mar. 18, pp. 443-447.

* cited by examiner

SOL-GEL DERIVED COMPOSITIONS

CROSS-REFERENCE TO RELATED APPLICATIONS

This application is a continuation of U.S. patent application Ser. No. 13/565,718, filed Aug. 12, 2012, which is a continuation-in-part of U.S. patent application Ser. No. 13/025,445, filed Feb. 11, 2011, now U.S. Pat. No. 8,754,182, which is a continuation-in-part of U.S. patent application Ser. No. 12/560,002, filed Sep. 15, 2009, now U.S. Pat. No. 8,367,793, which is a continuation-in-part of U.S. patent application Ser. No. 11/537,944, filed Oct. 2, 2006, now U.S. Pat. No. 7,790,830 B2, which claims priority to U.S. provisional patent application No. 60/722,619, filed on Sep. 30, 2005, the contents of which are hereby incorporated by reference herein in their entirety.

BACKGROUND

Field of the Invention

The present invention relates generally to the chemical arts. More particularly, the invention relates to sol-gel derived compositions having sorbent and other useful properties and to sol-gel derived materials useful in the preparation of the compositions.

Discussion of Related Art

U.S. Pat. No. 7,790,830 discloses swellable sol-gel useful, inter alia, as sorbent materials. There remains, however, a definite need for additional sol-gel compositions having varied swellability, for example, a greater or more rapid change in volume when the sol-gel derived material is exposed to amounts of sorbates that are less than that that which can induce full swelling of the sol-gel derived material; having selective reactivity of the sol-gel derived material; having an enhanced capacity to sorb selected sorbates, having a capacity to extract solutes, such as, metal ions and charged organic compounds.

SUMMARY OF THE INVENTION

Now in accordance with the invention there has been found sol gel derived materials and compositions that meet these and additional needs. In some aspects, a sol-gel derived material is obtained from at least one first precursor having the formula:

$$(RO)_x(R_2)_y Si((R_1)Si(R_2)_y(OR)_x)_z \quad (1)$$

where x is 2, 3 or 4, y is 0, 1 or 2 and z is 0 or 1, where the sum of x+y+y is 4, and where each R is independently a $C_1$ to $C_6$ alkyl, $R_1$ is an alkyl or aromatic bridging group and each $R_2$ is individually an organic group and at least one second precursor having the formula:

$$(RO)_3-Si-(CH_2)_n-Ar-(CH_2)_m-Si-(OR)_3 \quad (2)$$

where n and m are individually an integer from 1 to 8, Ar is a single-, fused-, or poly-aromatic ring, and each R is independently an alkyl group as defined above.

In some aspects, R is methyl or ethyl.

In some aspects, each $R_2$ is independently an aliphatic or non-aliphatic hydrocarbon containing up to about 30 carbons. And in some aspects, the hydrocarbon is a straight-chain hydrocarbon, a branched-chain hydrocarbon, a cyclic hydrocarbon or an aromatic hydrocarbon where, in some aspects, the hydrocarbon is substituted with a primary amine, a secondary amine, a tertiary amine, a thiol, an isocyanate, a carbamate, an alcohol, an alkene, a pyridine, a halogen, a halogenated hydrocarbon or combinations thereof.

And in additional aspects, sol-gel derived compositions containing a plurality of alkylsiloxy substituents are obtained from at least one precursor corresponding to the formula:

$$((R_5)_3O-Si)_2-R_6 \quad (4)$$

wherein $R_5$ is methyl or ethyl and $R_6$ is a methyl, ethyl, propyl or butyl. In some aspects the precursor the precursor is bis(triethoxysilyl)ethane. And in some aspects, the alkylsiloxy substituents correspond to the formula:

$$-(O)_w-Si-(R_3)_{4-w}$$

where $R_3$ is independently a hydrocarbon containing up to about 30 carbons, w is an integer from 1 to 3 and, in some aspects, the alklysiloxy substituents include at least one heteroatom selected from sulfur, oxygen, nitrogen, phosphorous or halogen atom or combinations thereof.

In some aspects, the second precursor is a bis(trialkoxysilylalkyl)benzene. And in some embodiments, the bis(trialkoxysilylalkyl)benzene is 1,4-bis(trimethoxysilylmethyl)benzene (BTB), bis(triethoxysilylethyl)benzene (BTEB) or mixtures thereof.

In additional aspects, sol-gel derived compositions containing a plurality of alkylsiloxy substituents are then obtained from such sol-gel derived materials. In some aspects, the alkylsiloxy substituents correspond to the formula:

$$-(O)_w-Si-(R_3)_{4-w}$$

where $R_3$ is independently a hydrocarbon containing up to about 30 carbons, w is an integer from 1 to 3 and, in some aspects, the alklysiloxy substituents include at least one heteroatom selected from sulfur, oxygen, nitrogen, phosphorous or halogen atom or combinations thereof.

And in additional aspects, the sol-gel derived composition is obtained from bis(triethoxysilyl)ethane and contains a plurality of alkylsiloxy substituents. In some aspects, the alkylsiloxy substituents correspond to the formula:

$$-(O)_w-Si-(R_3)_{4-w}$$

where $R_3$ is independently a hydrocarbon containing up to about 30 carbons, w is an integer from 1 to 3 and, in some aspects, the alklysiloxy substituents include at least one heteroatom selected from sulfur, oxygen, nitrogen, phosphorous or halogen atom or combinations thereof.

DETAILED DESCRIPTION OF THE PREFERRED EMBODIMENTS

Particular embodiments of the invention are described below in considerable detail for the purpose of illustrating its principles and operation. However, various modifications may be made, and the scope of the invention is not limited to the exemplary embodiments described below.

Unless otherwise described, all technical terms used herein have the same meaning as commonly understood by one of ordinary skill in the art to which the present invention pertains.

As used herein, the term "solute" means any compound dissolved in a solvent.

As used herein, the term "sorbate" means an organic compound that is taken up by the sol-gel derived material by adsorption, absorption, or a combination thereof.

As used herein, "swellable" means increases to at least 1.5 times its volume, when dry, if placed in excess acetone.

As used herein, "nanoparticle" means a particle sized between about 0.05 and about 50 nanometers in one dimension.

In accordance with one aspect of the invention, there has been discovered novel sol-gel derived materials formed from at least one first alkoxysilane precursor having the formula:

$$(RO)_x-(R_2)_y-Si-((R_1)-Si-(R_2)_y-(OR)_x)_z \qquad (1)$$

where x is 2, 3 or 4, y is 0, 1 or 2 and z is 0 or 1, where the total of x+y+y is 4, and where each R is independently hydrogen or a $C_1$ to $C_6$ alkyl, such as methyl or ethyl, $R_1$ is an alkyl or aromatic bridging group and each $R_2$ is individually an organic group and at least one second alkoxysilane precursor having the formula:

$$(RO)_3-Si-(CH_2)_n-Ar-(CH_2)_m-Si-(OR)_3 \qquad (2)$$

where n and m are individually an integer from 1 to 8, Ar is a single-, fused-, or poly-aromatic ring, and each R is independently an alkyl group as described above.

In some embodiments, each $R_2$ is independently an aliphatic or non-aliphatic hydrocarbon containing up to about 30 carbons, with or without one or more hetero atoms (e.g., sulfur, oxygen, nitrogen, phosphorous, and halogen atoms) or hetero atom containing moieties.

Representative $R_2$s include straight-chain hydrocarbons, branched-chain hydrocarbons, cyclic hydrocarbons, and aromatic hydrocarbons and are unsubstituted or substituted. In some aspects, $R_2$ includes alkyl hydrocarbons, such as $C_1$-$C_3$ alkyls, and aromatic hydrocarbons, such as phenyl, and aromatic hydrocarbons substituted with heteroatom containing moieties, such —OH, —SH, —NH$_2$, and aromatic amines, such as pyridine.

Representative substituents for $R_2$ include primary amines, such as aminopropyl, secondary amines, such as bis(triethoxysilylpropyl)amine, tertiary amines, thiols, such as mercaptopropyl, isocyanates, such as isocyanopropyl, carbamates, such as propylbenzylcarbamate, alcohols, alkenes, pyridine, halogens, halogenated hydrocarbons or combinations thereof.

Exemplary first precursors include, without limitation, tetramethoxysilane, methyltrimethoxysilane, methyltriethoxysilane, phenyltrimethoxysiliane, aminopropyltrimethoxy silane, 1,4-bis(triethoxysilyl)benzene, 2-(trimethoxysilylethyl)pyridine, bis(triethoxysilylpropyl) amine, para-trifluoromethylterafluorophenyltrimethoxysilane, (tridecafluoro-1,1,2,2-tetrahydro-octyl)trimethoxysilane, 3-aminopropyltrimethoxysilane, 3-mercaptopropyltrimethoxysilane, 3-cyanopropyltrimethoxysilane, 3-sulfoxypropyltrimethoxysilane, isocyanopropyltrimethoxysilane, 2-(3,4-epoxycyclohexyl)ethyltrimethoxysilane, isocyanopropyltrimethoxysilane and trimethoxypropylbenzylcarbamate.

Exemplary second precursors include, without limitation, bis(trialkoxysilylalkyl)benzenes, such as 1,4-bis(trimethoxysilylmethyl)benzene (BTB), bis(triethoxysilylethyl)benzene (BTEB), and mixtures thereof, with bis(triethoxysilylethyl)benzene being preferred.

In some aspects, sol-gel derived materials of the present invention are prepared from a reaction medium containing a mixture of a least one first alkoxysilane precursor and at least one second alkoxysilane alkoxysilane precursor under acid or base sol-gel conditions, preferably base sol-gel conditions. The alkoxysilane precursor mixture is formed in any suitable solvent. Representative solvents for use with the base catalysts include, without limitation, tetrahydrofuran (THF), acetone, dichloromethane/THF mixtures containing at least 15% by vol. THF, and THF/acetonitrile mixtures containing at least 50% by vol. THF. Of these exemplary solvents, THF is preferred.

The relative amounts of first and second precursors in the mixture will depend on the particular precursors and the particular application for the resulting sol-gel derived material. The relative amounts will be readily determinable without undue experimentation. In some embodiments, the amounts vary from about 5:95 mol:mol to about 60:40 mol:mol first alkoxysilane precursor to second alkoxysilane precursor and in some embodiments from about 20:80 mol:mol to about 50:50 mol:mol first alkoxysilane precursor to second precursor.

The alkoxysilane precursor mixture is preferably present in the reaction medium at between about 0.25M and about 1M, more preferably between about 0.4M and about 0.8M, most preferably about 0.5 M.

A catalytic solution comprising a stoichiometric amount of water and a catalyst is rapidly added to the reaction medium to catalyze the hydrolysis and condensation of the alkoxysilane precursors. Conditions for sol-gel reactions are well-known in the art and include the use of acid or base catalysts Preferred conditions are those that use a base catalyst. Exemplary base catalysts include, without limitation, tetrabutyl ammonium fluoride (TBAF), 1,5-diazabicyclo[4.3.0]non-5-ene (DBN), and alkylamines (e.g., propyl amine), of which TBAF is preferred.

As noted above, acid catalysts can be used to form swellable sol-gels, although acid catalysts are less preferred. Exemplary acid catalysts include, without limitation, any strong acid such as hydrochloric acid, phosphoric acid, sulfuric acid and the like.

After gellation, the material is preferably aged for an amount of time suitable to induce syneresis, which is the shrinkage of the gel that accompanies solvent evaporation. The aging drives off much, but not necessarily all, of the solvent. While aging times vary depending upon the catalyst and solvent used to form the gel, aging is typically carried out for about 15 minutes up to about 7 days, preferably from about 1 hour up to about 4 days. Aging is carried out at room temperature or elevated temperature (i.e., from about 18 C up to about 60 C), either in open atmosphere, under reduced pressure, or in a container or oven.

In some aspects, sol-gel derived compositions containing a plurality of alkylsiloxy substituents are obtained from at least one precursor corresponding to the formula:

$$((R_5)_3O-Si)_2-R_6 \qquad (4)$$

wherein $R_5$ is methyl or ethyl and $R_6$ is a methyl, ethyl, propyl or butyl. And in some aspects the precursor the precursor is bis(triethoxysilyl)ethane.

Solvent and catalyst extraction (i.e., rinsing) is carried out during or after the aging process. Preferred materials for extraction include, without limitation, any organic solvent of medium polarity, including, without limitation, THF, acetone, ethanol, and acetonitrile, either alone or in combination.

After rinsing, the sol-gel derived material is characterized by the presence of residual silanols. In some embodiments, the silanol groups are derivatized using any reagent that includes both one or more silanol-reactive groups and one or more non-reactive alkyl groups. The derivatization process results in the end-capping of the silanol-terminated polymers present within the sol-gel derivative material with alkylsiloxy groups having the formula:

$$-(O)_w-Si-(R_3)_{4-w} \qquad (3)$$

where each $R_3$ is independently an organic group as described above and w is an integer from 1 to 3.

One suitable class of derivatization reagents includes halosilane reagents that contain at least one halogen group and at least one alkyl group $R_3$, as described above. The halogen group can be any halogen, preferably Cl, Fl, I, or Br. Preferred halosilanes or dihalosilanes include, without limitation, chlorosilanes, dichlorosilanes, fluorosilanes, difluorosilanes, bromosilanes, dibromosilanes, iodosilanes, and di-iodosilanes. Exemplary halosilanes suitable for use as derivatization reagents include, without limitation, cynanopropyldimethyl-chlorosilane, phenyldimethyl chlorosilane, chloromethyldimethylchlorosilane, (trideca-fluoro-1,1,2,2-tertahydro-octyl)dimethylchlorosilane, n-octyldimethylchlorosilane, and n-octadecyldimethylchlorosilane.

Another suitable class of derivatization reagents includes silazanes or disilazanes. Any silazane with at least one reactive group and at least one alkyl group $R_3$, as described above can be used. A preferred disilazane is hexamethyldisilazane.

The sol-gel derived material is preferably rinsed in any of the rinsing agents described above, and then dried. Drying can be carried out under any suitable conditions, but preferably in an oven, e.g., for about 2 hours at about 60 C to produce the porous, swellable, sol-gel derived material.

In some aspects, the materials contain a plurality of flexibly tethered and interconnected organosiloxane particles having diameters on the nanometer scale. The organosiloxane nanoparticles form a porous matrix defined by a plurality of aromatically cross-linked organosiloxanes that create a porous structure.

And in some aspects, the resulting sol-gel derived materials are hydrophobic, resistant to absorbing water, and swellable to at least 1.5 times its volume, when dry, in acetone. Preferred sol-gel derived materials are swellable to at least two times their original volume, more preferably at least five times their original volume, most preferably up to about eight to ten times their original volume in acetone.

Without being bound by theory, it is believed that swelling is derived from the morphology of interconnected organosilica particles that are cross-linked during the gel state to yield a nanoporous material or polymeric matrix. Upon drying the gel, tensile forces are generated by capillary-induced collapse of the polymeric matrix. This stored energy can be released as the matrix relaxes to an expanded state when a sorbate disrupts the inter-particle interactions holding the dried material in the collapsed state.

It is a distinct advantage of the invention, that the properties of the sol-gel derived material can be modified by the first precursor. In certain, aspects the first alkoxysilane precursor can be selected to effect the swellability of the sol-gel derived material, for example, by providing a greater and more rapid change in volume when the sol-gel derived material is exposed to amounts of sorbates that are less than that that which can induce full swelling of the sol-gel derived material; to provide selective reactivity of the sol-gel derived material; to provide an enhanced capacity to sorb selected sorbates, to provide a capacity to extract solutes, such as, metal ions and charged organic compounds, from solvents which materials made exclusively from the second alkoxysilane precursor cannot. Further, the properties of the sol-gel derived materials can be modified to increase their dispersibility in aqueous media to alter the total surface area of the unswollen material, and to provide a greater thermal stability than possessed by materials made exclusively from second alkoxysilane precursors. Still further, the sol-gel derived material can be modified to include attachment sites for further modification.

Examples of first precursors useful to effect the swellability of the sol-gel derived material include 1,6-bis(trimethoxysilyl)hexane, 1,4-bis(trimethoxysilyl)benzene methyltrimethoxysilane, phenyltrimethoxysilane, with phenyltrimethoxysilane being preferred. Examples of first precursors useful to prepare sol-gel derived materials to provide an enhanced capacity to sorb selected sorbates, such as fluorinated compounds, including, but not limited to perfluorooctane, include para-trifluoromethylterafluorophenyltrimethoxysilane, (tridecafluoro-1,1,2,2-tetrahydro-octyl)trimethoxy silane.

Examples of first precursors useful to prepare sol-gel derived materials for extracting solutes, such as metal ions, and charged organic compounds, include first precursors having a ligand containing —OH, —SH, —NH$_2$ or aromatic nitrogen groups, such as 2-(trimethoxysilylethyl)pyridine, 3-aminopropyltrimethoxysilane, 3-mercaptopropyltrimethoxysilane and isocyanopropyltrimethoxysilane, with 3-mercaptopropyltrimethoxysilane being particularly useful for extracting $Hg^{2+}$, $Pb^{2+}$, $Cu^{2+}$, $Ba^{2+}$ and $Fe^{2+}$ metal ions and 3-aminopropyltrimethoxysilane being particularly useful for extracting charged organic compounds, such as Acid Blue 25. Examples of first precursors useful to prepare sol-gel derived materials having selective reactivity, such as reactivity with amine containing compounds, include 2-(3, 4-epoxycyclohexyl)ethyltrimethoxysilane and isocyanopropyltrimethoxysilane. Examples of first precursors useful to prepare sol-gel derived materials modified to include attachment sites for further modification, such as first precursors with protected amine groups, include trimethoxypropylbenzylcarbamate.

In some aspects, sol-gel derived materials of the present invention are prepared from a reaction medium containing bis(triethoxysilyl)ethane under base sol-gel conditions.

The alkoxysilane precursor mixture is formed in any suitable solvent. Representative solvents for use with the base catalysts include, without limitation, tetrahydrofuran (THF), acetone, dichloromethane/THF mixtures containing at least 15% by vol. THF, and THF/acetonitrile mixtures containing at least 50% by vol. THF. Of these exemplary solvents, THF is preferred.

The alkoxysilane precursor mixture is preferably present in the reaction medium at between about 0.25M and about 1M, more preferably between about 0.4M and about 0.8M, most preferably about 0.5 M.

A catalytic solution comprising a stoichiometric amount of water and a catalyst is rapidly added to the reaction medium to catalyze the hydrolysis and condensation of the alkoxysilane precursors. Conditions for sol-gel reactions are well-known in the art and include the use of base catalysts containing fluoride ions, such as tetrabutyl ammonium fluoride (TBAF).

After gellation, the material is preferably aged for an amount of time suitable to induce syneresis, which is the shrinkage of the gel that accompanies solvent evaporation. The aging drives off much, but not necessarily all, of the solvent. While aging times vary depending upon the catalyst and solvent used to form the gel, aging is typically carried out for about 15 minutes up to about 7 days, preferably from about 1 hour up to about 4 days. Aging is carried out at room temperature or elevated temperature (i.e., from about 18 C up to about 60 C), either in open atmosphere, under reduced pressure, or in a container or oven.

Solvent and catalyst extraction (i.e., rinsing) is carried out during or after the aging process. Preferred materials for extraction include, without limitation, any organic solvent of medium polarity, including, without limitation, THF, acetone, ethanol, and acetonitrile, either alone or in combination.

After rinsing, the sol-gel derived material is characterized by the presence of residual silanols. In some embodiments, the silanol groups are derivatized using any reagent that includes both one or more silanol-reactive groups and one or more non-reactive alkyl groups. The derivatization process results in the end-capping of the silanol-terminated polymers present within the sol-gel derivative material with alkylsiloxy groups having the formula:

  (3)

where each $R_3$ is independently an organic group as described above and x is an integer from 1 to 3.

One suitable class of derivatization reagents includes halosilane reagents that contain at least one halogen group and at least one alkyl group $R_3$, as described above. The halogen group can be any halogen, preferably Cl, Fl, I, or Br. Preferred halosilanes or dihalosilanes include, without limitation, chlorosilanes, dichlorosilanes, fluorosilanes, difluorosilanes, bromosilanes, dibromosilanes, iodosilanes, and di-iodosilanes. Exemplary halosilanes suitable for use as derivatization reagents include, without limitation, cynanopropyldimethyl-chlorosilane, phenyldimethylchlorosilane, chloromethyldimethylchlorosilane, (trideca-fluoro-1,1,2,2-tertahydro-octyl)dimethylchlorosilane, n-octyldimethyl-chlorosilane, and n-octadecyldimethylchlorosilane.

Another suitable class of derivatization reagents includes silazanes or disilazanes. Any silazane with at least one reactive group X and at least one alkyl group R, as described above can be used. A preferred disilazane is hexamethyldisilazane.

The sol-gel derived material is preferably rinsed in any of the rinsing agents described above, and then dried. Drying can be carried out under any suitable conditions, but preferably in an oven, e.g., for about 2 hours at about 60 C to produce the porous, swellable, sol-gel derived material.

In some aspects, the resulting sol-gel derived material is hydrophobic, resistant to absorbing water, and swellable to at least 1.5 times its volume, when dry, in acetone. In some aspects, the resulting sol-gel derived material absorbs from about 5 to about 15 its weight and in some aspects from about 8 to about 12 its weight of acetone and other sorbates. In some aspects, the resulting sol-gel derived material has a pore volume of from about 0.9 mL/g to about 1.1 mL/g and in some aspects, the resulting sol-gel derived material has a surface area from about 600 m2/g to about 1200 m2/g.

The sol-gel derived materials can be used in any suitable form, including in powder or pellet forms. Powdered forms of the sol-gel derived materials are characterized by a high surface area, for example, in the range of about 800 $m^2$/which allows for rapid and effective uptake of the sorbate or solute. Depending upon the manner in which grinding of the sol-gel derived materials is carried out to obtain the powdered form, the particle sizes may vary widely. Preferred powdered forms will have a high surface area (e.g., about 800 $m^2$/g) and an average particle size that is less than about 250 µm, for example, between about 50 to about 250 µm.

In some embodiments and in particular those embodiments where the sol-gel derived material is in pellet form, the porous swellable sol-gel derived material and the interactive material are combined with a binder, such as a polymeric binder. Useful polymeric binders include microcrystalline cellulose and elastomeric polymers. Preferred elastomeric polymers have a glass transition temperature below about 150 C, the temperature at which the sol-gel derived material begins to decompose. For, example, polystyrene is a currently most preferred elastomeric polymer binder. Other suitable thermoplastic elastomers are described in U.S. Pat. Nos. 7,834,093, 7,799,873, 7,799,868, 7,799,869, 7,790,805, 7,786,206, 7,776,968, 7,771,627, 7,744,781, 7,737,206, 7,655,719, 7,462,309, 6,596,792, 6,162,849, 5,194,480, 7,837,901, 7,815,998, 7,645,399, 7,608,342, 7,550,097, 7,402,616, 6,720,369, 4,634,730, 7,834,093, 7,799,873, 7,799,868, 7,799,869, 7,790,805, 7,786,206, 7,776,968, 7,771,627, 7,744,781, 7,737,206 which patents are herein incorporated by reference.

The amount of binder will depend on the particular application and will be readily determinable by one skilled in the art. In some embodiments, the binder is present in an amount of at least 50% and in some embodiments at least 95% and in some embodiments at least 99.5% based on the weight of the sol-gel derived material.

Pellets can be formed in any desired shape and size suitable for their desired application. For example, in some embodiments, a sol-gel solution is poured into a silicone mold before gellation. The solution is then gelled in the mold to produce a pellet having the desired dimensions.

In other embodiments, pellets are prepared by casting the sol-gel derived material in a die having a desired internal configuration and dimension, which will result in a polymerized sol-gel conforming to the desired size and shape. In such embodiments, the components are combined using any suitable means, such as by combining in a ball mill. The ingredients are then feed into a die using any suitable means such as by using a screw feeder or a gravity feeder. Screw feeders provide the advantage that they crush infeed particles to achieve a more favorable size consistency before compacting. In some cases, heat generated by the screw feeding process may be beneficial, for example, by softening a thermoplastic polymer binder prior to casting.

The ingredients are then compressed at a sufficient force, typically from about 1-8 tonnes, for a sufficient time, typically from about five to about ten minutes, to form a pellet. In some embodiments where the binder is a thermoplastic polymer, the die is preheated to a temperature less than the decomposition temperature of the sol-gel derived material, typically less than about 150 C.

In some embodiments, the sol-gel derived material is disposed on or within a support. Useful supports include any type of solid or semi-solid object capable of directly or indirectly supporting the sol-gel derived material. For example, the support can be any type of container, vessel, or material having at least one surface for supporting the sol-gel derived material. By "directly" it is meant that the sol-gel derived material is in intimate physical contact with at least one support surface. For example, the sol-gel derived material can be attached, bonded, coupled to, or mated with all or only a portion of the at least one surface. By "indirectly" it is meant that the sol-gel derived material is housed by or within the support without being in direct contact with the support. For example, the sol-gel derived material can be afloat in a fluid (e.g., water) that is contained by the support.

In one aspect of the present invention, the support is a fixed bed reactor (e.g., a packed or fluidized bed reactor). The fixed bed reactor contains the sol-gel derived material, in some embodiments encased between two or more layers of a metal or metal alloy (e.g., stainless steel), so that the sol-gel derived material remains stationary or substantially stationary when a fluid is passed through the reactor. The fixed bed reactor can include at least one inlet through which the fluid is supplied, and at least one outlet through which the fluid is discharged.

The fixed bed reactor can have any shape (e.g., cylindrical), dimensions, and orientation (e.g., vertical or horizontal). The fixed bed reactor may be stand-alone or placed directly in-line with the fluid flow. In some embodiments, the fixed bed reactor additionally includes an inert, non-swelling filler or media (e.g., ground glass) to provide void spaces for swelling of the sol-gel derived material.

In another aspect of the present invention, the support is a filter having at least one porous membrane entirely or partially formed with, coupled to, bonded with, or otherwise in intimate contact with the sol-gel derived material. In some embodiments, the filter has a sandwich-like configuration formed of the sol-gel derived material disposed on or embedded between first and second porous membranes. Suitable porous membranes include materials (e.g., metals, metal alloys, or polymers) having pores of sufficient size to permit passage of the sol-gel derived material. For example, the porous membrane can be comprised of a nano- or micro-sized polymers or polymer-blended materials, such as a nano-sized nylon-polyester blends.

In another aspect of the present invention, the support is a vessel for holding the fluid. Suitable vessels include stirred tanks or vats. The sol-gel derived material is disposed on or embedded within at least one surface of the vessel. Alternatively, the sol-gel derived material floats or is suspended in the fluid contained in the vessel.

The following examples are for the purpose of illustration only and are not intended to limit the scope of the claims, which are appended hereto.

EXAMPLE 1

Samples of sol-gel derived materials were prepared using 5 mol % of a first alkoxysilane precursor corresponding to the formula $(CH_3O)_3$-Si—R, where R was:
(0) Control (100 mol % BTEB)
(1)—$CH_2CH_2CH_2SH$
(2)—Phenyl
(3)—Benzyl carbamate
and 95 mol % bis(trimethoxysilylethyl)benzene (BTEB).

The samples were prepared by mixing the precursor(s) in acetone and using TBAF as the catalyst for the sol-gel reaction. The residual silanols were derivatized using hexamethyldisilazane. Swelling was measured by adding acetone to each sample, until the first appearance of non-absorbed fluid. The volume by weight of acetone absorbed by each sample is reported in Table 1 below.

TABLE 1

Swelling of sol-gel derived materials
containing 5% mol:mol first precursor

| Sample | Swelling (mL abs/g) |
| --- | --- |
| (0) | 4.5 |
| (1) | 7.5 |
| (2) | 7.8 |
| (3) | 8.2 |

It can be seen that sol-gel derived material containing the first precursors adsorbed more acetone, i. e., underwent an increased amount of swelling.

EXAMPLE 2

Sol-gel derived materials were prepared using bis(trimethoxysilylethyl)benzene (BTEB) and varying amounts of phenyltrimethoxysilane (PTMS) as shown in Table 2 below. The samples were prepared by mixing the precursor(s) in acetone and using TBAF as the catalyst for the sol-gel reaction. Residual silanols were derivatized using octadecyldimethylchlorosilane. Swelling was measured by adding acetone to each sample, until the first appearance of non-absorbed fluid. The volume by weight of acetone absorbed by each sample is reported in Table 2 below.

TABLE 2

Swellability of BTEB:PTMS sol-gel derived materials

| Volume Ratio BTEB:PTMS | Swelling (mL abs/g) | Derivatization Required |
| --- | --- | --- |
| 100:0 | 4.5 | Yes |
| 90:10 | 5.0 | Yes |
| 80:20 | 7.1 | Yes |
| 70:30 | 5.3 | Yes |
| 60:40 | 5.2 | Yes |
| 50:50 | 6.2 | Yes |
| 40:60 | 7.4 | Yes |
| 30:70 | 6.6 | No |
| 20:80 | 6.5 | No |
| 10:90 | 3.7 | No |

It can be seen that samples containing up to 90 mol % PTMS absorbed significant amounts of acetone, i. e., underwent significant swelling when compare to the control. Furthermore, samples containing from 70 mol % to 90 mol % PTMS underwent significant swelling without derivatization of the residual silanols.

The partition coefficients of the control and the sample made with 20 Mol % BTEB and 80 Mol % PTMS, for toluene and for butanol were also measured. The sample made with 20 Mol % BTEB and 80 Mol % PTMS had a partition coefficient to absorb non-polar toluene (k=750) that was decreased compared to the partition coefficient of BTEB k=20,000 for the control. Concomitantly, the partition coefficient for the butanol, which is more polar than toluene, increased from 35 for the control to 110 for the sample made with 20 Mol % BTEB and 80 Mol % PTMS.

From the above description of the invention, those skilled in the art will perceive improvements, changes and modifications. For example, one skilled in the art will appreciate that other agents and materials, such as charged organic polymers (e.g., polyethyleneimine) and/or organosilica nanoparticles having different surface chemistries can be included in the sensor material to facilitate detection of sorbates. Such improvements, changes, and modifications are within the skill of the art and are intended to be covered by the appended claims.

The invention claimed is:

1. A sol-gel composition obtained from at least a first alkoxysilane precursor and a second alkoxysilane precursor, where at least the second alkoxysilane precursor is a bis(trialkoxysilylalkyl)benzene that is 1,4-bis(trimethoxysilylmethyl)benzene (BTB), bis(triethoxysilylethyl)benzene (BTEB), or a mixture thereof, and where the sol-gel composition is swellable to at least 1.5 times its dry volume, when placed in excess acetone.

2. The sol-gel composition of claim 1 wherein the first alkoxysilane precursor has the formula:

$$(RO)_x(R_2)_y Si((R_1)Si(R_2)_y(OR)_x)_z \qquad (1)$$

where x is 2, 3 or 4, y is 0, 1 or 2 and z is 0 or 1, where the sum of x+y+z is 4, and where each R is independently a $C_1$ to $C_6$ alkyl, $R_1$ is an alkyl or aromatic bridging group and each $R_2$ is individually an organic group and the second alkoxysilane precursor has the formula:

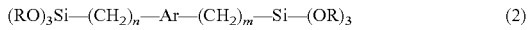

$$(RO)_3Si-(CH_2)_n-Ar-(CH_2)_m-Si-(OR)_3 \qquad (2)$$

where n and m are individually an integer from 1 to 8, Ar is a single-, fused-, or poly-aromatic ring, and each R is independently an alkyl group as defined above; and wherein the second alkoxysilane precursor is 1,4-bis(trimethoxysilylmethyl) benzene (BTB), bis(triethoxysilylethyl)benzene (BTEB), or a mixture thereof.

3. The sol-gel composition of claim 2, wherein the amount of first alkoxysilane precursor to second alkoxysilane precursor is from about 5:95 mol:mol to about 60:40 mol:mol.

4. The sol-gel composition of claim 2, wherein the amount of first alkoxysilane precursor to second alkoxysilane precursor is from about 20:80 mol:mol to about 50:50 mol:mol.

5. The sol-gel composition of claim 2, wherein R is methyl or ethyl.

6. The sol-gel composition of claim 2, wherein each $R_2$ is independently an aliphatic or non-aliphatic hydrocarbon containing up to about 30 carbons.

7. The sol-gel composition of claim 6, wherein the hydrocarbon is a straight-chain hydrocarbon, a branched-chain hydrocarbon, a cyclic hydrocarbon or an aromatic hydrocarbon.

8. The sol-gel composition of claim 1, wherein the sol-gel composition contains a plurality of alkylsiloxy substituents.

9. The sol-gel composition of claim 8, wherein each of the alkylsiloxy substituents correspond to the formula:

$$-(O)_w-Si-(R_3)_{4-w} \qquad (3)$$

where $R_3$ is independently a hydrocarbon containing up to about 2 carbons, and w is an integer from 1 to 3.

10. The sol-gel composition of claim 9, wherein each of the alklysiloxy substituents include at least one heteroatom selected from sulfur, oxygen, nitrogen, phosphorous, a halogen, or a combination thereof.

11. The sol-gel composition of claim 1, wherein the first precursor is tetramethoxysilane, methyltrimethoxysilane, methyltriethoxysilane, phenyltrimethoxysiliane, aminopropyl-trimethoxysilane, 1,4-bis(triethoxysilyl)benzene, 2-(trimethoxysilylethyl)pyridine, bis(triethoxysilylpropyl)amine, para-trifluoromethylterafluorophenyltrimethoxysilane, (tridecafluoro-1,1,2,2-tetrahydro-octyl)trimethoxysilane, 3-aminopropyltrimethoxysilane, 3-mercaptopropyltrimethoxysilane, 3-cyanopropyltrimethoxysilane, 3-sulfoxypropyltrimethoxysilane, isocyanatopropyltrimethoxysilane 2-(3,4-epoxycyclohexyl)ethyltrimethoxysilane, and trimethoxypropylbenzylcarbamate.

12. The sol-gel composition of claim 1, wherein the bis(trialkoxysilylalkyl)benzene is BTEB.

13. The sol-gel composition of claim 1, wherein the sol-gel composition is swellable to at least five times its dry volume, when placed in excess acetone.

14. The sol-gel composition of claim 1, wherein the sol-gel composition absorbs from about 5 to about 15 times its dry weight, of acetone, when placed in excess acetone.

15. The sol-gel composition of claim 14, wherein the sol-gel composition absorbs from about 8 to about 12 its dry weight, of acetone, when placed in excess acetone.

16. The sol-gel composition of claim 1, wherein the sol-gel composition has a pore volume of from about 0.9 mL/g to about 1.1 mL/g.

17. The sol-gel composition of claim 1, wherein the sol-gel composition has a surface area from about 600 $m^2$/g to about 1200 $m^2$/g.

* * * * *

UNITED STATES PATENT AND TRADEMARK OFFICE
CERTIFICATE OF CORRECTION

PATENT NO. : 10,391,470 B2
APPLICATION NO. : 15/264536
DATED : August 27, 2019
INVENTOR(S) : Paul L. Edmiston et al.

Page 1 of 1

It is certified that error appears in the above-identified patent and that said Letters Patent is hereby corrected as shown below:

In the Claims

In Claim 9, Line 4, wherein it states: "...a hydrocarbon containing up to about 2 carbons", should read: "...a hydrocarbon containing up to about 30 carbons".

In Claim 10, Line 2, "alklysiloxy" is misspelled, and should read: "alkylsiloxy".

In Claim 11, Line 3, "phenyltrimethoxysiliane" is misspelled, and should read: "phenyltrimethoxysilane".

In Claim 11, between Line 10-11, a "," is missing after the word "isocyanatopropyltrimethoxysilane 2-(3, 4-epoxycyclohexy)", and should read: "isocyanatopropyltrimethoxysilane, 2-(3, 4-epoxycyclohexy)".

In Claim 15, Line 2, wherein it states: "to about 12", should read: "to about 12 times".

Signed and Sealed this
Twelfth Day of November, 2019

Andrei Iancu
*Director of the United States Patent and Trademark Office*